United States Patent [19]
Ruggero

[11] Patent Number: 5,797,626
[45] Date of Patent: Aug. 25, 1998

[54] AUTOMATIC FAST-ACTION COUPLING FOR DOMESTIC IRRIGATION SYSTEMS

[75] Inventor: Ferrari Ruggero, Parma, Italy

[73] Assignee: Ferrari Group S.r.l., Parma, Italy

[21] Appl. No.: 685,661

[22] Filed: Jul. 24, 1996

[30] Foreign Application Priority Data

Jul. 26, 1995 [IT] Italy ................ PR95 A 000022

[51] Int. Cl.[6] .................................................. F16L 55/00
[52] U.S. Cl. .............................. 285/5; 285/87; 285/316
[58] Field of Search ....................................... 285/87, 5

[56] References Cited

U.S. PATENT DOCUMENTS 757,929   4/1904   Huhsman ............................. 285/87
1,080,675 12/1913 Berg .................................. 285/87
4,776,614 10/1988 Marrison et al. ..................... 285/87

*Primary Examiner*—Dave W. Arola
*Attorney, Agent, or Firm*—Oblon, Spivak, McClelland, Maier & Neustadt, P.C.

[57] ABSTRACT

The invention relates to the sector of fast-action couplings for domestic irrigation system. The fixed central body has mounted on the outside, integral therewith, a; fastening element on the outside of which an external body (5) is able to slide longitudinally. The fastening element has a plurality of lugs each of which is provide with tooth and a protuberance which can be inserted into the corresponding slits and formed in the thickness of the external body. An extension spring is arranged between the external body and the fasting element and a ring made of elastic material or a plurality of teeth act as elements for gripping the male connector.

5 Claims, 2 Drawing Sheets

AUTOMATIC FAST-ACTION COUPLING FOR DOMESTIC IRRIGATION SYSTEMS

BACKGROUND OF THE INVENTION

1. Field of the Invention

The present invention relates to an automatic fast-action coupling for domestic irrigation systems.

2. Discussion of the Background

For some time now a wide range of accessories designed to simplify and rationalize operations have been available for domestic irrigation systems; the basic components among these accessories may be regarded as the fast-action couplings designed to simplify both the operation of extending the hoses and inserting, at the end of a section of hose, components such as sprinklers, spray guns and the like.

In order to use the aforementioned fast-action couplings, both the coupling itself and the male connector must be held and a certain pressure exerted so as to fit the two components one inside the other. In order to separate them, again after taking hold of them, a pulling force must be exerted on the two components in order to disengage them from the gripping systems present therein.

The disengaging operation thus performed firstly requires the use of both hands and, in some cases, considerable force in order to overcome jamming of the gripping systems due, essentially, to the presence of soil which has penetrated inside them.

SUMMARY OF THE INVENTION

The object of the present invention is that of providing a fast-action coupling with the possibility of automatic release of the male connector using only one hand.

These and other objects are all achieved by the automatic fast-action coupling for domestic irrigation systems according to the present invention, comprising a fixed central central body, an external body displaceable along the longitudinal axis of coupling and a fastening element, arranged between the said fixed central body and the external body, having a plurality of radially flexible longitudinal lugs each of which has formed on it externally a plurality of teeth and a plurality of protuberances to which slits on the said external body correspond.

Other characteristic features of the coupling according to the present invention are the presence of an extension spring compressed between the external body and the fastening element and the presence, between the external body and fixed central body on the side where the male connector is inserted, of a ring made of elastic material or a plurality of teeth designed to form an element for gripping the said male connector.

BRIEF DESCRIPTION OF THE DRAWINGS

These and other characteristic features will emerge more clearly from the following description of a preferred embodiment illustrated, purely by way of a non-limiting example, in the accompanying drawings in which.

DESCRIPTION OF THE PREFERRED EMBODIMENTS

Figure 1:
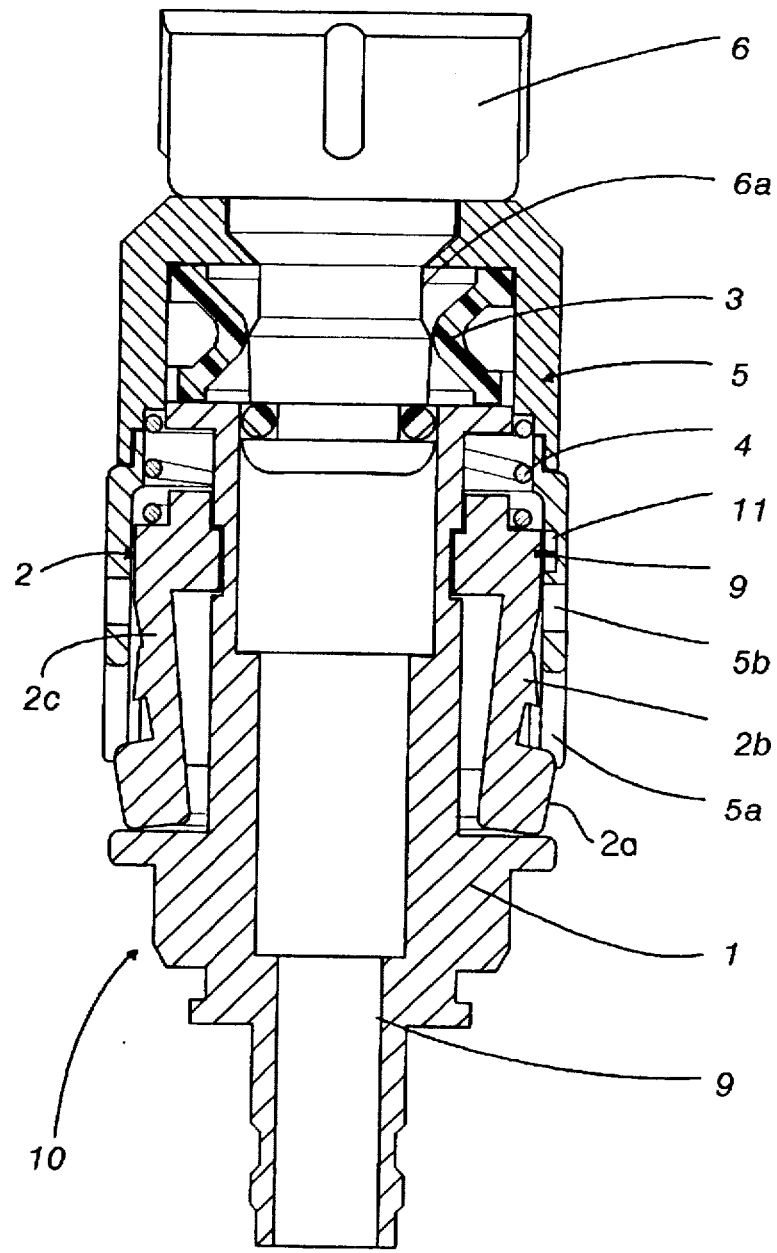
FIG. 1 shows a side view, sectioned along the longitudinal diametral plane, of the coupling according to the present invention.

FIG. 1 shows an automatic fast-action coupling 10 for domestic irrigation systems comprising: a fixed central body 1; a fastening element 2 provided with radially flexible lugs 2c having a plurality of teeth 2b and a plurality of (preferably two) protuberances 2a mounted integrally on the fixed central body 1; an external body 5 displaceable along the longitudinal axis of the coupling and having a plurality of slits 5a and 5b. The slits 5a and 5b are formed so as to correspond respectively to the protuberances 2a and the teeth 2b.

Between the external body 5 and the fastening element 2 there is positioned an extension spring 4 and between the external body 5 and the fixed central body 1, on the side where the male connector 6 is inserted, there is positioned a ring made of elastic material 3 designed to form the element for gripping the said male connector.

Reference number denotes a stud, fixed to the fastening element 2, which is inserted into a groove 11 formed in the external body 5 so as to prevent removal of the external body 5 itself.

A description is now given of the coupling according to the present invention in connection with the reference numbers shown in the drawings.

Prior to insertion of the male connector 6, the fastening element 2 has the teeth 2b of the flexible lugs 2c disengaged from the corresponding slits 5b of the external body 5, the aforementioned lugs being radially flexed towards the inside of the coupling since the teeth 2b strike against the edge of the slits 5b.

The spring 4 is at the maximum extension permitted by the assembly configuration of the coupling, and the ring made of elastic material 3 is deformed by the minimum amount, the external body 5 being in the position where it is pulled out by the maximum amount with respect to the fixed central body 1.

Taking hold of the coupling in question with one hand and the male connector 6 with the other hand, these two elements are then inserted one inside the other; continuing to push with both hands the two elements to be engaged, the male connector 6, once it comes up against the external body 5, causes a longitudinal displacement of said external body and radial flexing of the lugs 2c towards the center of the coupling since their teeth 2b come into contact with the internal surface of the external body 5.

When, the slits 5b are located opposite the teeth 2b, the latter, owing to the return movement into the rest position determined by the radial flexibility of the lugs 2c, penetrate into the slits themselves, effecting, with their profile, locking of the external body 5.

The spring 4 is in its fully compressed condition.

The ring made of elastic material 3, which precisely owing to its elasticity compresses due to the action of longitudinal displacement of the external body 5 imparted thereto by the manual pushing force exerted on the male connector 5, is deformed, forming a convexity towards the outside of the coupling and adhering to a known concavity 6a present on the outside of the engaging nozzle of the male connector 6; this adhesion ensures locking of the said male connector.

In order to disengage said male connector from the coupling according to the present invention, all the protuberances 2a are compressed at the same time with the fingers of one hand, this causing radial flexing of the lugs 2c towards the center of the coupling and extraction of the teeth 2b from the respective slits 5b, In this manner, the external body 5, no longer retained by the teeth 2b, is automatically moved in the direction of the force imparted to it by extension of the spring 4 and causes expulsion of the male connector 6 from the coupling.

Figure 3:
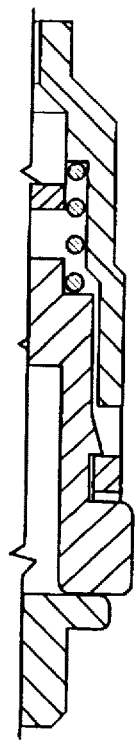
FIG. 3 is partial view of the coupling according to FIG. 2 in the fastened position.
Figure 2:
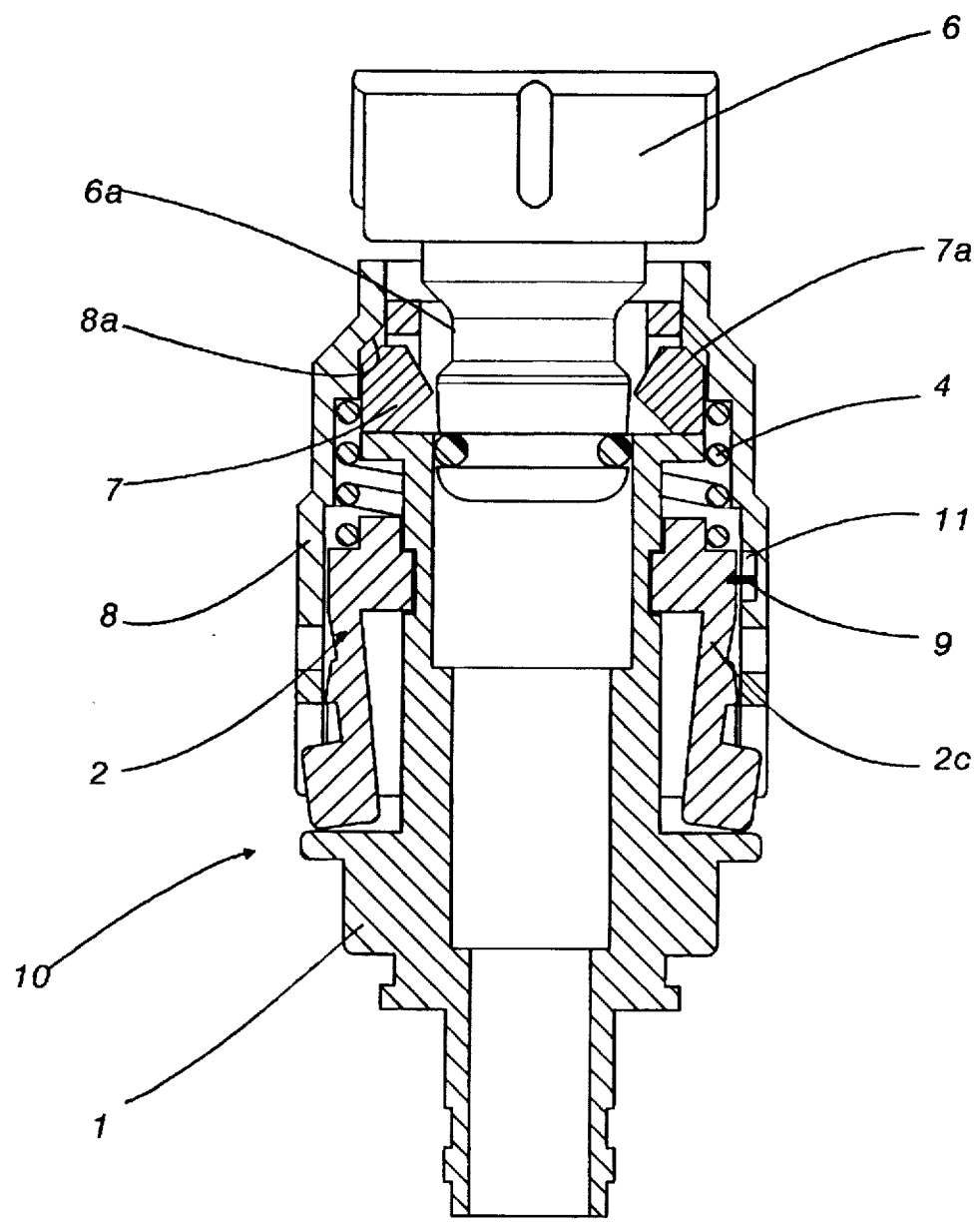
FIG. 2 shows a view, similar to that of FIG. 1, of an a possible variation of embodiment of the coupling.

In the above description specific reference has been made to the ring made of elastic material 3 acting as an element for gripping the male connector 6, but said function may be performed, as illustrated in FIGS. 2 and 3, also by a plurality of teeth 7 positioned circumferentially inside the fixed central body 1 at its end corresponding to the side where the male connector 6 is inserted. In such a solution the external body 8 has a section 8a of its internal part, corresponding to the position of the teeth 7, with an oblique configuration, this oblique surface having the same inclination as that of the corresponding face 7a of the teeth 7 so that, when the male connector 6 is pushed manually so as to penetrate into the coupling, the longitudinal thrust of the external body 8 on the plurality of teeth 7 is broken down into a transverse component which causes the radial displacement of the said teeth towards the centre of the coupling, said teeth being positioned in the concavity 6a present on the outside of the engaging nozzle of the male connector 6.

Obviously, numerous modifications and variations of the present invention are possible in light of the above teachings. It is therefore to be understood that within the scope of the appended claims, the invention may be practiced otherwise than as specifically described herein.

What is claimed:

1. Automatic fast-action coupling for domestic irrigation systems, comprising:

a fixed central body;

an external body displaceable along the longitudinal axis of the coupling;

a fastening element, fixed to the fixed central body, by coating means therebetween which is arranged between the said fixed central body and said external body and has a plurality of radially flexible longitudinal lugs which have, respectively formed thereon, a plurality of teeth and a corresponding plurality of protuberances to which a first and second plurality of slits, formed on the external body correspond, respectively; and an extension spring which is compressed between the external body and the fastening element wherein said teeth are respectively engageable with said first plurality of slits so as to couple said external body to said fixed body with said spring being compressed therebetween.

2. Coupling as claimed in claim 1, which comprises:

positioned between the external body and the fixed central body, on the side where a male connector is inserted, a ring made of elastic material, said ring comprising an element gripping the said male connector, said ring being held in place by said fixed central body and said external body.

3. Coupling as claimed in claim 2, wherein said ring is maintained in position between an inside wall of the external body and an upper plane of the central body.

4. Coupling as claimed in claim 1, which comprises:

positioned between the external body and the fixed central body, on the side where a male connector is inserted, a plurality of teeth which form elements gripping said male connector, said teeth each having an oblique face with an inclination identical to that of the corresponding internal surface of the external body.

5. Coupling as claimed in claim 1, wherein said coacting means comprises a stud fixed to the fastening element, said coacting means including said stud, teeth and protuberances maintaining, in an assembled relationship, the external body, the central body, the fastening element and said spring.

* * * * *

UNITED STATES PATENT AND TRADEMARK OFFICE
CERTIFICATE OF CORRECTION

PATENT NO. : 5,797,626
DATED : August 25, 1998
INVENTOR(S) : Ruggero FERRARI

It is certified that error appears in the above-identified patent and that said Letters Patent is hereby corrected as shown below:

On the title page, in Item [75], the inventor's name should read:

-- Ruggero Ferrari

Signed and Sealed this

Sixth Day of April, 1999

Attest:

Q. TODD DICKINSON

Attesting Officer

Acting Commissioner of Patents and Trademarks